(12) United States Patent
Yoshida et al.

(10) Patent No.: US 7,372,795 B2
(45) Date of Patent: May 13, 2008

(54) RECORDING APPARATUS AND METHOD FOR GENERATING AN INDEX FILE FOR A CONTENT FILE

(75) Inventors: Haruo Yoshida, Kanagawa (JP); Naoki Morimoto, Tokyo (JP); Masaharu Murakami, Tokyo (JP); Hiroshi Jinno, Tokyo (JP)

(73) Assignee: Sony Corporation, Tokyo (JP)

( * ) Notice: Subject to any disclaimer, the term of this patent is extended or adjusted under 35 U.S.C. 154(b) by 675 days.

(21) Appl. No.: 10/765,160

(22) Filed: Jan. 28, 2004

(65) Prior Publication Data
US 2004/0252605 A1 Dec. 16, 2004

(30) Foreign Application Priority Data
Feb. 28, 2003 (JP) ............................ 2003-054314

(51) Int. Cl.
G11B 7/00 (2006.01)
(52) U.S. Cl. ................................ 369/53.21; 369/44.32
(58) Field of Classification Search ............. 369/47.22, 369/53.2, 53.21; 386/52, 55, 57, 69–70, 386/95
See application file for complete search history.

(56) References Cited

U.S. PATENT DOCUMENTS 6,031,806 A * 2/2000 Tomita .................... 369/53.24
6,378,031 B1 * 4/2002 Kuno et al. .................... 711/4
2004/0090886 A1 * 5/2004 Sasaki ........................ 369/47.1
2004/0125719 A1 * 7/2004 Koseki .................... 369/47.34
2004/0233803 A1 * 11/2004 Kawamae et al. ......... 369/47.3
2005/0157599 A1 * 7/2005 Kiyama et al. .......... 369/30.03

FOREIGN PATENT DOCUMENTS

| JP | 2000-298974 | 10/2000 |
|----|-------------|---------|
| JP | 2003-45117 | 2/2003 |
| JP | 2003-50811 | 2/2003 |

* cited by examiner

Primary Examiner—Wayne Young
Assistant Examiner—Vanessa Coleman
(74) Attorney, Agent, or Firm—Oblon, Spivak, McClelland, Maier & Neustadt, P.C.

(57) ABSTRACT

Before each content file is recorded first to a recording medium, a flag indicating a recording state of a content file is generated corresponding to a physical area where an index file can be continuously recorded. An index file is generated which associates attribute information with the generated flag added thereto with real data of each content file, and the generated index file is recorded to the recording medium. Since fragmentation of the physical area where the index file is recorded is restrained to a minimum level, a high-speed reading operation is realized.

18 Claims, 13 Drawing Sheets

| START BYTE POSITION | DATA LENGTH | FIELD NAME |
|---|---|---|
| 0 | LP_1 | ENTRY #0 |
| LP_1 | LP_2 | ENTRY #1 |
| LP_1+LP_2 | LP_3 | ENTRY #2 |
| ... | ... | ... |
| LP_1+LP_n-1 | LP_n | ENTRY #n |

FIG.5

| START BYTE POSITION | DATA LENGTH | FIELD NAME |
|---|---|---|
| 0 | 2 | VERSION INFORMATION |
| 2 | 2 | FLAG |
| 4 | 1 | DATA TYPE |
| 5 | 4 | PRODUCTION DATE AND TIME |
| 9 | 4 | EDITING DATE AND TIME |
| 13 | 4 | DURATION |
| ... | ... | ... |
| 26 | 4 | ENTRY NUMBER |
| 30 | 1 | ENTRY PROPERTY |
| 31 | 4 | FOLDER PROPERTY |

FIG.6

| ENTRY NUMBER | #0 | #1 | #2 | #3 | #4 | #5 | #6 | #7 |
|---|---|---|---|---|---|---|---|---|
| ENTRY PROPERTY 1<br>0:FOLDER 1:FILE | 0 | 1 | × | 0 | 0 | 1 | 1 | 1 |
| ENTRY PROPERTY 2<br>0:NORMAL 1:SYSTEM | 0 | 0 | 1 | 0 | 0 | 1 | 0 | 0 |
| ENTRY PROPERTY 3<br>0:VALID 1:INVALID | 0 | 0 | 0 | 0 | 0 | 0 | 1 | 0 |
| ENTRY PROPERTY 4<br>0:NOT REFERRING<br>1:REFERRING | × | 0 | × | × | × | 1 | 1 | 0 |
| FOLDER PROPERTY | × | 0 | × | 0 | 3 | 3 | 4 | 4 |
| REFERRED COUNTER | 0 | 1 | 0 | 0 | 0 | 0 | 0 | 0 |
| REFERRING LIST | — | 5 | — | — | — | — | — | — |

CONTENT FILE

FIG. 7

VALID/INVALID FLAG OF ENTRY

RECORDING APPARATUS AND METHOD FOR GENERATING AN INDEX FILE FOR A CONTENT FILE

BACKGROUND OF THE INVENTION

1. Field of the Invention

This invention relates to a recording apparatus and method for recording each content file to a recording medium, and particularly to a recording apparatus and method for generating an index file for each content file to be recorded to a recording medium, the index file associating attribute information allocated to each content file with real data of each content file, and recording this index file to the recording medium.

This application claims priority of Japanese Patent Application No. 2003-054314, filed on Feb. 28, 2003, the entirety of which is incorporated by reference herein.

2. Description of the Related Art

In an information processing apparatus such as a personal computer or PDA (personal digital assistant), a non-linearly accessible hard disk and various recording media such as an optical disc, magneto-optical disc and memory card are loaded and data is recorded to these media. There has also been proposed a recording/reproducing apparatus provided with functions of reproducing and editing recorded data by adding a display unit such as a liquid crystal display panel and an audio generator unit such as a speaker to such a recording apparatus.

In this recording/reproducing apparatus, a user can designate a desired file to select data to be an object of the above-described reproduction and editing. This designation of a file may also be realized on the basis of a file name inputted via a user interface. Recently, there has also been proposed a recording apparatus and recording method that enables, in the case of recording various files, output of excerpt information of each file and easy search for desired data based on this excerpt information (see, for example, Patent Reference 1).

In this recording apparatus and recording method, desired file search is realized by using Quick Time as application software, then generating, as the above-described excerpt information, an index file collectively holding parts of video data and/or audio data of plural files recorded on a disc-shaped recording medium, and recording the index file at a predetermined position on the disc-shaped recording medium. This index file can be prepared, for example, in the format of a Quick Time file.

FIG. 1 shows an exemplary index file prepared by using a Quick Time file. This index file includes a movie resource part in which data for reference to the time necessary for reproducing the file and real data is stored, and a movie data part in which real data such as video and audio data are stored. The movie resource part includes tracks corresponding to four types of data, that is, a property track 62, a text track 63, a thumbnail picture track 64, and an introduction music track 65. The movie data part includes four types of real data, that is, property, text, thumbnail picture, and introduction music.

The property track 62 is defined as a chunk according to property data corresponding to each content file. The text track 63 is provided for registering text data such as the title or the like of each content file to be an object of search. The registered text data is stored as real data in the movie data part, and the data length and start time of the title or the like of each content file are represented by this text track 63.

The thumbnail picture track 64 can register one thumbnail per content file to be an object of search. The registered thumbnail picture is stored as real data in the movie data part, and the data length and start position of the thumbnail picture of each content file are represented by this thumbnail picture track 64. The introduction music track 65 can register one introduction part of audio data per content file to be an object of search. The registered introduction music is stored as real data in the movie data part, and the data length and start position of the introduction music of each content file are represented by the introduction music track 65.

Patent Reference: JP-A-2001-84705

Meanwhile, in such an index file, the real data of property, text, thumbnail and introduction music are sequentially stored in an area called entry of the above-described movie data part.

However, in a recording medium on which this index file is recorded, as addition and deletion of entries themselves and addition and deletion of real data recorded in the individual entries are repeated, the physical area in which the index file is recorded is fragmented. Therefore, an optical pickup must be sequentially moved over such fragment areas and the seek time or the like increases. Moreover, as the number of entries increases, the reading time of the index time significantly increases. Particularly in a recording apparatus in which a recording medium of a low access speed is loaded, it is difficult to realize smooth reading operation.

SUMMARY OF THE INVENTION

Thus, in view of the foregoing status of the art, it is an object of this invention to provide a recording apparatus and method that enables realization of high-speed reading operation by restraining fragmentation of the physical area where the index file is recorded, to a minimum level.

A recording apparatus according to this invention is adapted for generating an index file for each content file to be recorded to a recording medium, the index file associating attribute information allocated to each content file with real data of each content file, and recording the generated index file to the recording medium. The recording apparatus has an information adding unit for generating a flag indicating a recording state of a content file to be recorded to the recording medium and adding this flag to the attribute information. The information adding unit generates the flag in accordance with a physical area in which the index file can be continuously recorded, before each content file is recorded first to the recording medium.

In this recording apparatus, before each content file is recorded first to the recording medium, the information adding unit generates a flag indicating the recording state of the content file in accordance with a physical area in which an index file can be continuously recorded, then generates an index file associating attribute information having the generated flag added thereto with real data of each content file, and records the generated index file to the recording medium.

Another recording apparatus according to this invention is adapted for generating an index file for each content file to be recorded to a recording medium, the index file associating attribute information allocated to each content file with real data of each content file, and recording the generated index file to the recording medium. The recording apparatus has an information adding unit for generating a flag indicating a recording state of a content file to be recorded to the recording medium and adding this flag to the attribute information. Before each content file is recorded first to the recording medium, the information adding unit generates the flag in accordance with a physical area in which the index file can be continuously recorded, and also searches the recording medium for a free area in which the index file can be continuously recorded in accordance with the recording state of each content file with respect to the recording medium and generates the flag in accordance with the free area thus searched for.

In this recording apparatus, before each content file is recorded first to the recording medium, the information adding unit generates a flag indicating the recording state of each content file in accordance with an area in which an index file can be continuously recorded, then generates an index file associating attribute information having the generated flag added thereto with real data of each content file, and records the generated index file to the recording medium. Then, the information adding unit searches for a free area in which an index file can be continuously recorded in accordance with the recording state of each content file with respect to the recording medium, generates a flag corresponding to the free area thus searched for, and adds this flag to the attribute information.

A recording method according to this invention is adapted for generating an index file for each content file to be recorded to a recording medium, the index file associating attribute information allocated to each content file with real data of each content file, and recording the generated index file to the recording medium. In the recording method, before each content file is recorded first to the recording medium, a flag indicating a recording state of a content file is generated in accordance with a physical area in which the index file can be continuously recorded, and the flag is added to the attribute information.

In this recording method, before each content file is recorded first to the recording medium, a flag indicating the recording state of the content file is generated in accordance with a physical area in which an index file can be continuously recorded, then an index file associating attribute information having the generated flag added thereto with real data of each content file is generated, and the generated index file is recorded to the recording medium.

Another recording method according to this invention is adapted for generating an index file for each content file to be recorded to a recording medium, the index file associating attribute information allocated to each content file with real data of each content file, and recording the generated index file to the recording medium. In the recording method, before each content file is recorded first to the recording medium, a flag indicating a recording state of a content file is generated in accordance with a physical area in which the index file can be continuously recorded, and this flag is added to the attribute information. Also, the recording medium is searched for a free area in which the index file can be continuously recorded in accordance with the recording state of each content file with respect to the recording medium, then the flag is generated in accordance with the free area thus searched for, and this flag is added to the attribute information.

In this recording method, before each content file is recorded first to the recording medium, a flag indicating the recording state of each content file is generated in accordance with an area in which an index file can be continuously recorded, then an index file associating attribute information having the generated flag added thereto with real data of each content file is generated, and the generated index file is recorded to the recording medium. Then, a free area in which an index file can be continuously recorded is searched for in accordance with the recording state of each content file with respect to the recording medium, then a flag corresponding to the free area thus searched for is generated, and this flag is added to the attribute information.

As described above, in the recording apparatus and method to which this invention is applied, before each content file is recorded first to the recording medium, a flag indicating the recording state of the content file is generated in accordance with a physical area in which an index file can be continuously recorded, then an index file associating attribute information having the generated flag added thereto with real data of each content file is generated, and the generated index file is recorded to the recording medium.

Therefore, in the recording apparatus and method to which this invention is applied, fragmentation of physical arrangement of the index file on the recording medium can be prevented and such an index file can be read out at a high speed.

As described above, in the recording apparatus and method to which this invention is applied, before each content file is recorded first to the recording medium, a flag indicating the recording state of each content file is generated in accordance with an area in which an index file can be continuously recorded, then an index file associating attribute information having the generated flag added thereto with real data of each content file is generated, and the generated index file is recorded to the recording medium. Then, a free area in which an index file can be continuously recorded is searched for in accordance with the recording state of each content file with respect to the recording medium, then a flag corresponding to the free area thus searched for is generated, and this flag is added to the attribute information.

Therefore, in the recording apparatus and method to which this invention is applied, fragmentation of physical arrangement of the index file on the recording medium can be prevented even in the case where an index file is newly provided in accordance with the recording state of each content file with respect to the recording medium, and such an index file can be read out at a high speed.

BRIEF DESCRIPTION OF THE DRAWINGS

FIG. 5 is a view showing an exemplary property track.

FIG. 6 is a view showing exemplary property data.

FIG. 7 is a view showing exemplary property information at each entry number.

DESCRIPTION OF THE PREFERRED EMBODIMENT

An embodiment of this invention will now be described with reference to the drawings.

Figure 1:
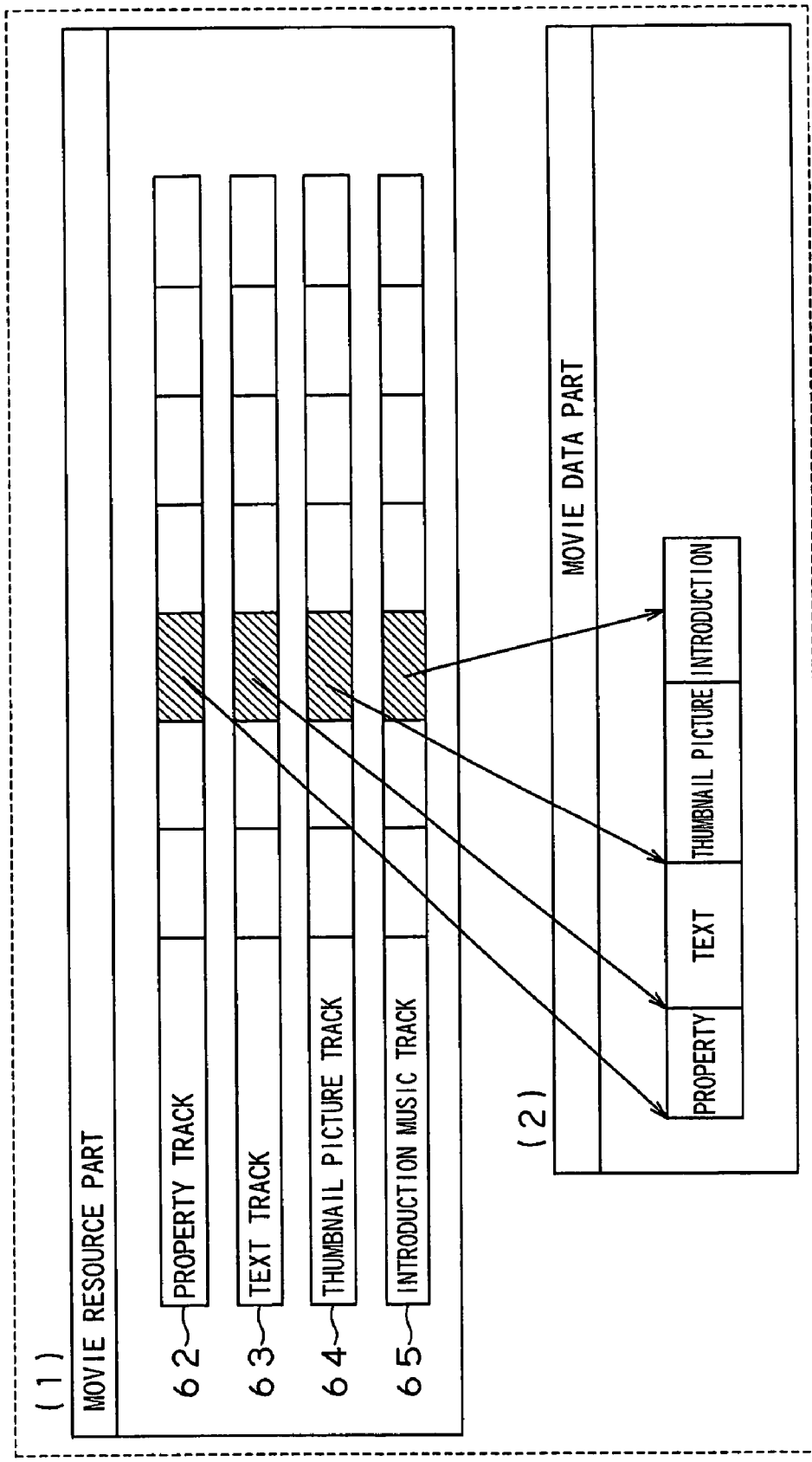
FIG. 1 is a view showing a typical index file prepared by using a Quick Time file.
Figure 2:
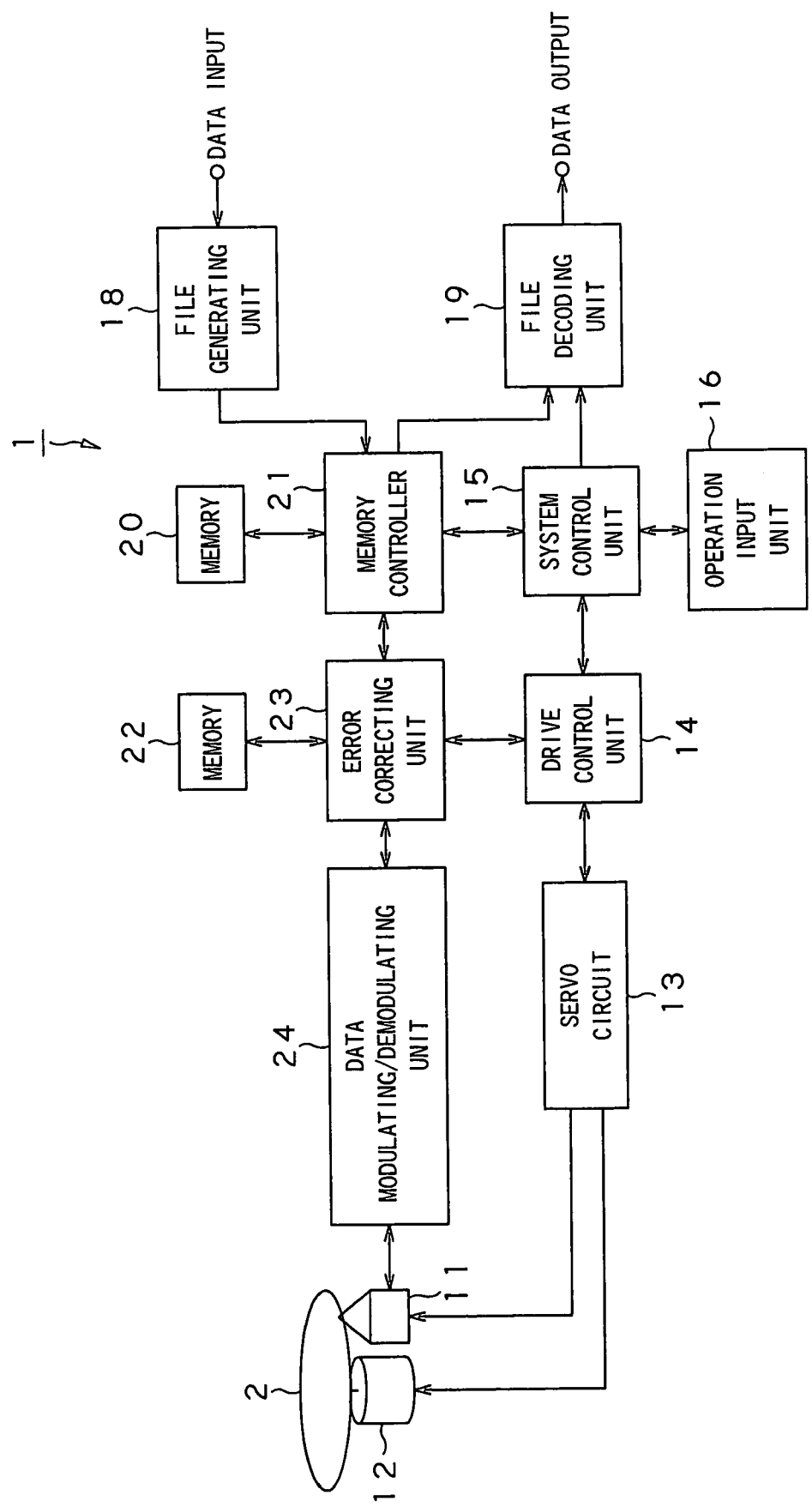
FIG. 2 is a view showing a block structure of a recording apparatus to which this invention is applied.

This invention is applied, for example, to a recording apparatus 1 as shown in FIG. 2. This recording apparatus 1 is adapted for recording data, for example, to a recording medium 2 such as a non-linearly accessible hard disk, an optical disc, magnetic disk, magneto-optical disc or semiconductor memory card. The recording apparatus 1 has an optical pickup 11 for detecting data from the recording medium 2 inserted in the apparatus, a spindle motor 12 for rotating the recording medium 2 set thereon, a servo circuit 13 for controlling the optical pickup 11 and the spindle motor 12 connected thereto, a drive control circuit 14 for transmitting a signal to the servo circuit 13 in response to a request from a system control unit 15, and an operation input unit 16 connected to the system control unit 15.

The recording apparatus 1 also has a file generating unit 18 for compression-coding data inputted via a connected data input terminal and thus generating a predetermined file, a file decoding unit 19 for decoding a supplied file and outputting the decoded file to a connected data output terminal, a memory controller 21 connected with the file generating unit 18, the file decoding unit 19 and the system control unit 15 and adapted for writing at least a file outputted from the file generating unit 18 to a memory 20, an error correcting unit for temporarily writing a file supplied from the memory controller 21 to a memory 22 and performing error correction of this file, and a data modulating/demodulating unit 24 for modulating and demodulating data supplied from the error correcting unit 23 and the optical pickup 11 connected thereto.

A video signal generated by a solid state image sensing device such as a CCD (charge coupled device), not shown, and an audio signal generated by an audio signal generating unit such as a microphone, not shown, are inputted to the file generating unit 18 via the data input terminal.

When a video signal is inputted, the file generating unit 18 compression-codes this video signal, for example, on the basis of the MPEG (Moving Picture Experts Group) system. In such a case, the file generating unit 18 first performs A/D conversion to digitize the video signal and rearrange frames in an order suitable for coding processing. The file generating unit 18 performs processing such as DCT coding, quantization and variable-length coding for each of the rearranged frames.

When an audio signal is inputted, the file generating unit 18 compression-codes this audio signal, for example, on the basis of the MPEG system. In such a case, the file generating unit 18 divides the inputted audio signal, for example, into 32 subband signals, and quantizes the subband signals in accordance with predetermined weighting, thus forming a bit stream.

The file generating unit 18 multiplexes the coded video signal and audio signal and further transforms the data structure so that each signal can be handled by software that can be controlled in accordance with the time base. In this invention, Quick Time is used as such software. This Quick Time can handle motion pictures, static images, texts, audio data such as MIDI (musical instrument digital interface) and the like. Quick Time is an OS extension function for synchronously reproducing these data. Hereinafter, a file generated by storing various data using this Quick Time is referred to as Quick Time file. This Quick Time file may also be generated under the control of the system control unit 15. The file generating unit 18 outputs the generated Quick Time file to the memory controller 21.

In recording, the memory controller 21 sequentially writes the Quick Time file inputted from the file generating unit 18 to the memory 20. Under the control of the system control unit 15, the memory controller 21 also reads out the Quick Time file written in the memory 20. Since the transfer rate of the Quick Time file varies by constituent element, reading of the Quick Time file continuously written in the memory 20 is constantly monitored by the system control unit 15 so that no overflow or underflow occurs in the memory 20.

In reproduction, the memory controller 21 sequentially writes the Quick Time file inputted from the error correcting unit 23 to the memory 20. Under the control of the system control unit 15, the memory controller 21 also reads out the Quick Time file written in the memory 20 at the timing of synchronization when demultiplexing the multiplexed file, and outputs the read-out file to the file decoding unit 19.

In recording, the error correcting unit 23 writes the Quick Time file supplied from the memory controller 21 to the memory 22. The error correcting unit 23 also performs processing such as interleave and error correction coding of the Quick Time file written in the memory 22, then reads out the resulting file and transfers the read-out file to the data modulating/demodulating unit 24.

In reproduction, the error correcting unit 23 is supplied with data demodulated by the data modulating/demodulating unit 24. The error correcting unit 23 writes the supplied data to the memory 22 and performs de-interleave processing and error correction processing. The error-corrected Quick Time file is written to the memory 20 via the memory controller 21, as described above.

The data modulating/demodulating unit 24 performed predetermined modulation of the data transferred thereto from the error correcting unit 23 and transmits the modulated data to the optical pickup 11. The data modulating/demodulating unit 24 also performs predetermined demodulation of the data transmitted thereto from the optical pickup 11 and transfers the demodulated data to the error correcting unit 23.

The optical pickup 11 emits a laser beam from a built-in semiconductor laser and condenses the laser beam on an information recording surface of the recording medium 2 via an objective lens. That is, since the optical pickup 11 generates a laser beam on the basis of the data inputted thereto from the data modulating/demodulating unit 24, the data is sequentially recorded to the recording medium 2. The optical pickup 11 also guides return light acquired from the recording medium 2 as a result of casting the laser beam thereon to a predetermined light-receiving element via the objective lens and outputs the result of light reception by the light-receiving element to the data modulating/demodulating unit 24. The optical pickup 11 moves the objective lens in the optical pickup 11 in a direction of optical axis and in a direction orthogonal to the optical axis, using a biaxial coil, not shown, on the basis of a focusing driving signal and a tracking driving signal supplied thereto from the servo circuit 13.

A magnetic field may be applied to the recording medium 2, using a magnetic field modulating driver, not shown, under the control of the data modulating/demodulating unit 24.

The spindle motor 12 rotates the recording medium 2, for example, at a constant linear velocity (CLV), constant angular velocity (CAV) or zone CAV (ZCAV) under the control of the servo circuit 13.

The servo circuit 13 transmits a focusing driving signal and a tracking driving signal to the optical pickup 11 under the control of the drive control unit 14. The servo circuit 13 also transmits a signal for controlling the rotational speed of the recording medium 2 to the spindle motor 12 under the control of the drive control unit 14.

The drive control unit 14 controls the servo circuit 13 on the basis of a control signal transmitted from the system control unit 15. As the operation of the servo circuit 13 is thus controlled freely, the recording operation to or reproduction operation from the recording medium 2 is realized.

The system control unit 15 controls each constituent element via the drive control unit 14 and the memory controller 21 connected thereto. The system control unit 15 may also control each constituent element on the basis of an instruction from the user via the operation input unit 16.

The file decoding unit 19 decomposes the Quick Time file into a video signal and an audio signal under the control of the system control unit 15. The file decoding unit 19 performs decoding processing of the decomposed video signal and audio signal, respectively, and outputs the decoded signals to outside via the data output terminal. For example, in the case where the file has been compression-coded in accordance with the MPEG system by the file generating unit 18, the file decoding unit 19 performs processing such as variable-length decoding, inverse DCT transform and inverse quantization of the video signal and audio signal.

The block structure of the recording apparatus 1 is not limited to the above-described embodiment. For example, constituent elements such as the file decoding unit 19 for executing reproduction processing may be omitted.

In the case of recording data to the recording medium 2 by using such a recording apparatus 1, a video signal and an audio signal inputted via the data input terminal are A/D-converted by the file generating unit 18, and processing such as frame rearrangement, DCT transform, quantization and variable-length coding is performed. The signals are thus converted to a Quick Time file. The Quick Time file is sequentially written to the memory 22 by the memory controller 21, and then read out by the memory controller 21 under the timing control of the system control unit 15. The read-out file is outputted to the error correcting unit 23. Redundant data such as an error correcting code is added to the Quick Time file by the error correcting unit 23 and the Quick Time file is outputted to the data modulating/demodulating unit 24. The data outputted to the data modulating/demodulating unit 24 is modulated so that inter-symbol interference is restrained. The modulated data is transmitted to the optical pickup 11 and the sequentially recorded to the recording medium 2.

In case of reproducing data recorded on the recording medium 2 by such a recording apparatus 1, data extracted by converting reflected light of light cast on the recording medium 2 from the optical pickup 11 to an electrical signal is first transmitted to the data modulating/demodulating unit 24. The data is demodulated by the data modulating/demodulating unit 24, and de-interleave processing and error correction processing are performed by the error correcting unit. After timing adjustment by the memory controller 21, the data is outputted to the file decoding unit 19. In the file decoding unit 19, the Quick Time file is decomposed into a video signal and an audio signal, and processing such as variable-length decoding, inverse DCT transform and inverse quantization are performed. The signals are then transmitted to another reproducing unit via the data output unit and sequentially reproduced.

An index file prepared by using a Quick Time file will now be described. The details of Quick Time are described, for example, in "INSIDE MACINTOSH: Quick Time (Japanese Version), Addison-Wesley" or the like.

An index file, which will be described later, is prepared by using this Quick Time file. The index file handles four types of data, that is, property, thumbnail picture, text, and sound. Property is data representing attributes of a file handling a video data and audio data to be recorded to a recording medium (hereinafter referred to as content file). Thumbnail picture is video data of one typical picture such as the first picture. Text is data representing character strings of the content file. Sound is short-time audio data of each content file. This sound can be arbitrarily set by the user or may be audio data of an introduction part of the first five seconds in the content file.

Figure 3:
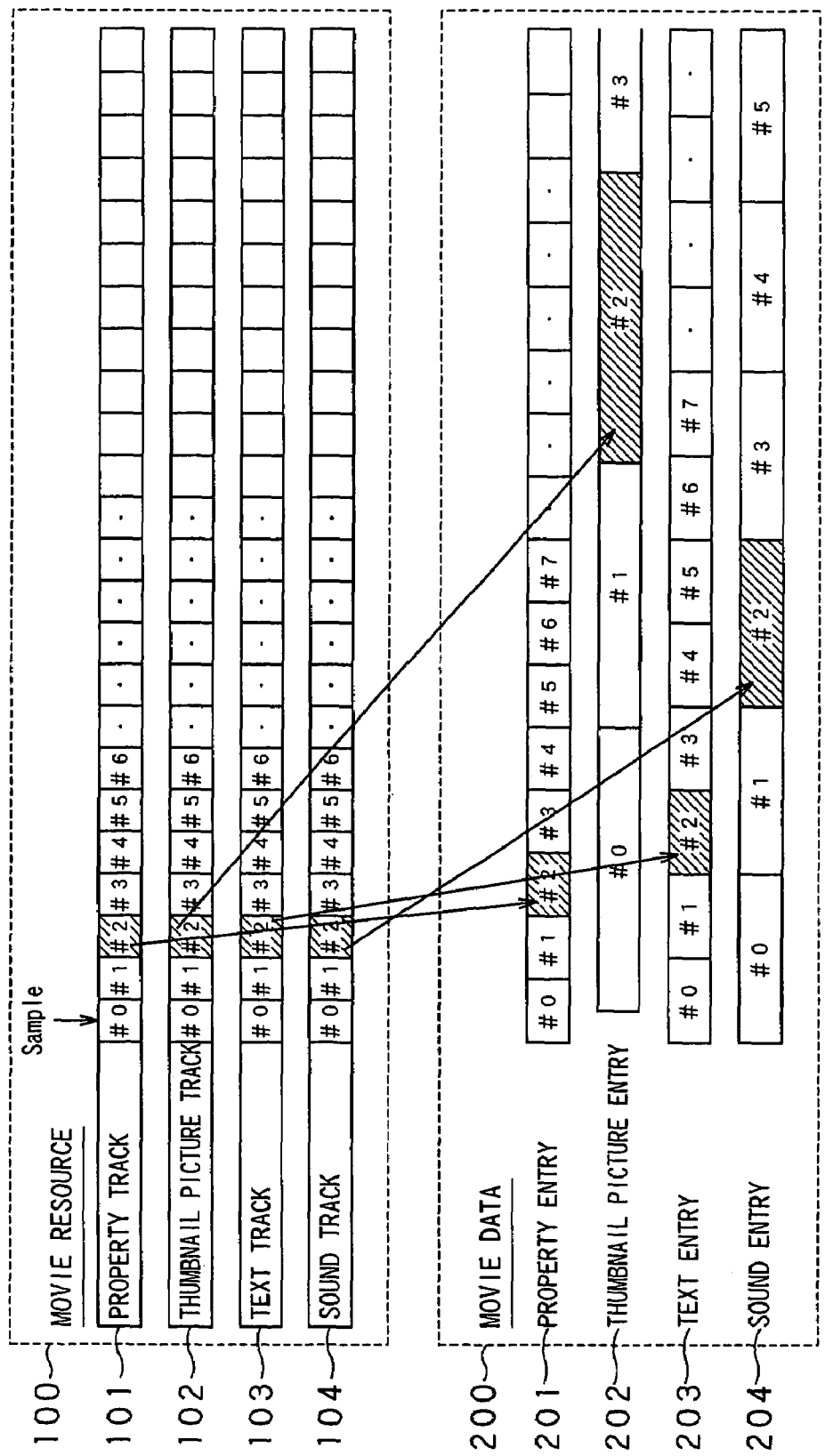
FIG. 3 is a view showing an exemplary index file prepared by using a Quick Time file.

FIG. 3 shows an exemplary index file prepared by using a Quick Time file handling a video signal and an audio signal. The index file includes a movie resource part 100 and a movie data part 200. In the movie resource part 100, information for reference to the time necessary for reproducing the file and real data is stored. In the movie data part 200, real data such as video data and audio data to be recorded to a recording medium are stored.

The movie resource part 100 includes a property track 101, a thumbnail picture track 102, a text track 103, and a sound track 104, corresponding to the above-described four types of data. The movie data part 200 includes a property entry 201, a thumbnail entry 202, a text entry 203, and a sound entry 204, for storing the above-described real data. The real data are stored in entries #0 to #n in the various entries of the movie data part 200. The entry #n indicates entry number and is a number unique to the index file (n is an integer equal to or larger than 2). This entry number enables identification of an entry in which real data of property is stored.

Figure 4:
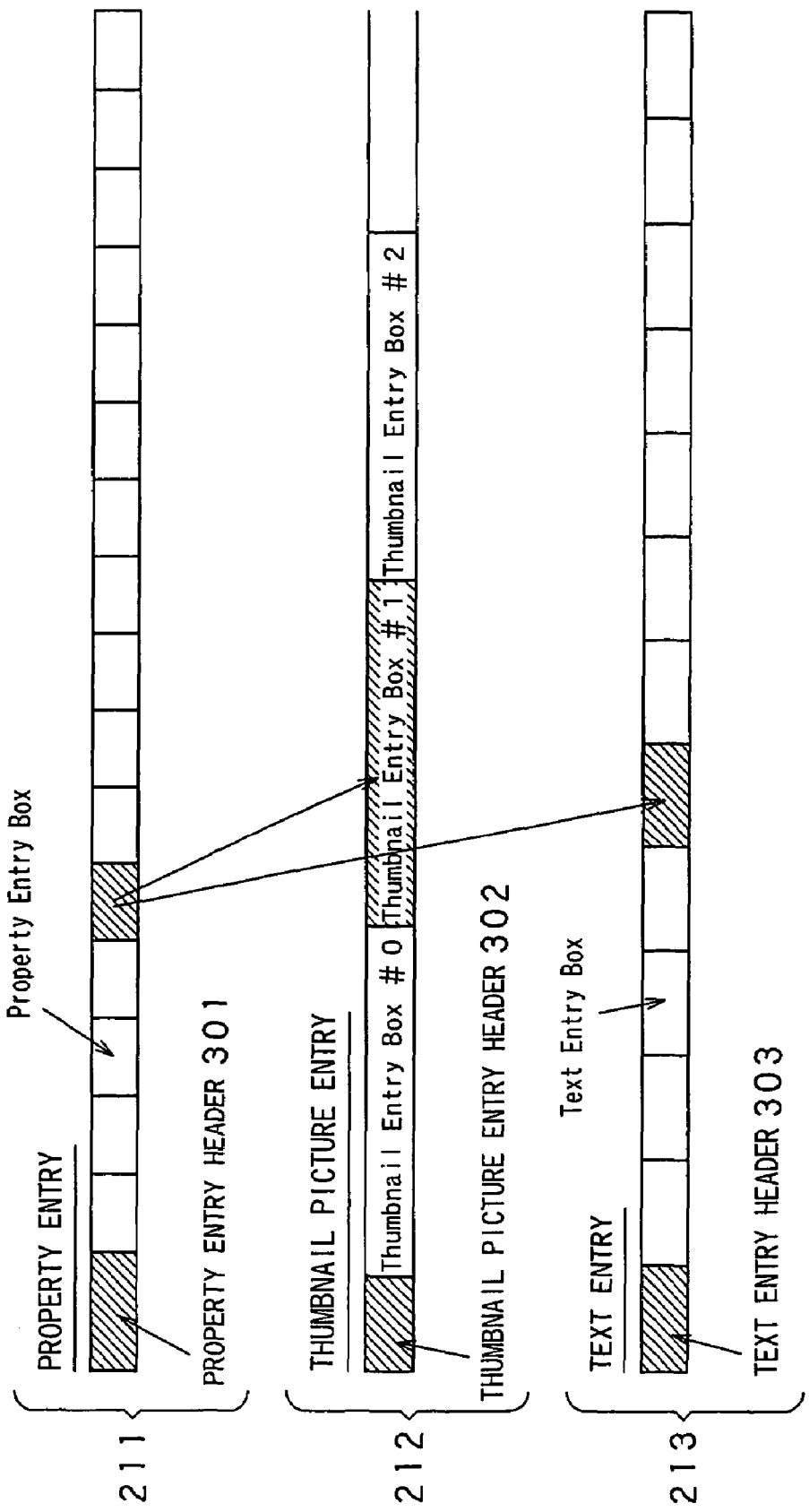
FIG. 4 is a view showing another exemplary index file prepared by using a Quick Time file.

FIG. 4 shows another exemplary index file prepared by using a Quick Time file. The index file includes a property entry 211, a thumbnail picture entry 212, and a text entry 213, for storing the above-described real data. The real data are stored corresponding to entry numbers in the various entries 211 to 213. In the property entry 211, a property entry header 301 is provided at the leading part, as area equivalent to the above-described movie resource part 100. In the thumbnail picture entry 212, a thumbnail picture entry header 302 is provided. In the leading part of the text entry, 213, a text entry header 303 is provided.

FIG. 5 is a view showing an example of the property track 101. As shown in FIG. 5, for each of entries #0 to #n where real data of each content file expressed as chunks of each content file are recorded, start byte position, data length and the like are described. The relation between the thumbnail picture, text and sound track parts 102 to 104 and the real data is described in a manner similar to the example of FIG. 5.

FIG. 6 is a view showing an example of property data. As shown in FIG. 6, "version information" of a content file is described over two bytes from a start byte, and "flag" is described from the second byte. "Data type" for identifying dynamic image, static image, audio or the like is described from the fourth byte. "Production date and time" based on the date and time of preparation of the content file is described from the fifth byte. "Editing date and time" based on the date and time when the content file was corrected is described from the ninth byte. Moreover, "duration" based on the time necessary for reproduction is described from the 13$^{th}$ byte.

As this property data, for example, an entry number is described from the 26$^{th}$ byte and entry property for identifying the attribute of the entry is described from the 30$^{th}$ byte. Also folder property for identifying a folder to which the entry belongs is described from the 31$^{st}$ byte. On the basis of such information of each entry, a hierarchical structure between plural entries can be prescribed.

FIG. 7 shows an example of property information at each entry number (entries #0 to #7).

Entry property 1 is described to identify whether each entry #n is a folder or file. In this example shown in FIG. 7, entries #0, #3 and #4 are folders and entries #1, #5, #6 and #7 are files. Entry property 2 is described to identify whether each entry #n is normal information or system information. In this example shown in FIG. 7, entry #2 is system information.

Entry property 3 is described to identify whether the content file recorded in each entry #n is valid or invalid. For example, in the case where the content file has been deleted, the value of entry property 3 of the corresponding entry is "1". That is, this entry property 3 can represent the recording state of the content file. In the example shown in FIG. 7, a so-called invalid flag is set for entry #6 to indicate that a registered content file C has been deleted.

Entry property 4 is described to identify whether or not the content file or the like registered in each entry #n refers to another content file or the like. In the example shown in FIG. 7, it is indicated that another file is referred to in entries #5 and #6.

Folder property represents the number of a folder situated on a higher order with respect to each entry #n. In the example shown in FIG. 7, the folder of entry #0 is on a higher order than entries #1 and #3. The folder of entry #3 is on a higher order than entries #4 and #5. The folder of entry #4 is on a higher order than entries #6 and #7.

Referred counter indicates the number of times of reference of each entry #n by other files. Referring file list indicates referring file(s) in the case where this file is referred to by other files.

In FIG. 7, when a content file A is registered in entry #1, a content file B is registered in entry #5 and a content file D is registered in entry #7, since the content file B refers to the content file A, entry property 4 for entry #5 is "1". The referred counter for entry #1 is "1" and the referring file list for entry #1 is "5".

In the above-described entry property 3, though an entry corresponding to a content file to be deleted can be deleted itself, it is relatively disadvantageous because also the track parts 101 to 104 must be rewritten. On the other hand, in this invention, in the case of newly registering a content file in an entry where an invalid flag is set, such an entry may be simply overwritten and the invalid flag set in this entry property 3 may be reset as a valid flag. Specifically, in the example shown in FIG. 7, in the case of newly registering a content file in entry #6 where an invalid flag is set, this entry #6 may be simply overwritten and the track parts 101 to 104 need not be rewritten. Therefore, the overall burden on the recording apparatus 1 can be reduced. As the size of each entry #n is made fixed length, the size of data to be accommodated in the movie resource part 100 can be fixed. This enables significant reduction in the overall data size of the movie resource part 100.

Figure 8:
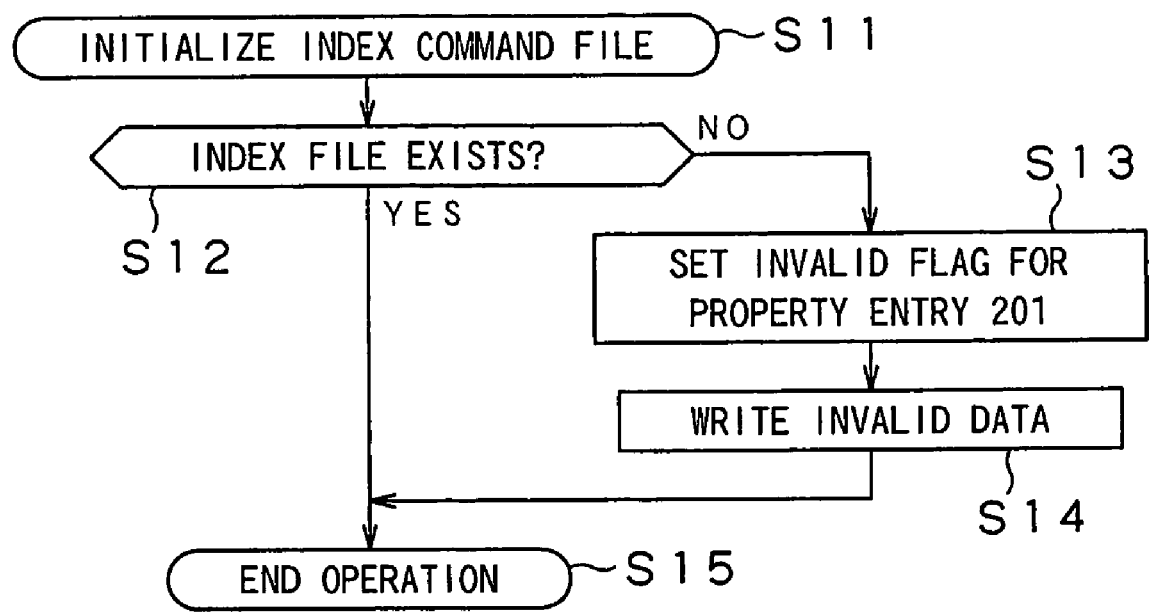
FIG. 8 is a flowchart for explaining an index file initialization method in the recording apparatus to which this invention is applied.

A procedure of initializing the above-described index file in the recording apparatus 1 to which this invention is applied will now be described with reference to FIG. 8.

First, as the system control unit 15 receives an index file initialization command inputted via the operation input unit 16 at step S11, the system control unit 15 shifts to step S12, then accesses the recording medium 2 and confirms the existence of an index file. If there is no index file on the recording medium 2, the system control unit 15 shifts to step S13. On the other hand, if there is an index file on the recording medium, it is indicated that the index file has already been initialized and available for use. Therefore, the system control unit 15 shifts to step S15 to perform an operation to end this initialization processing.

Figure 9:
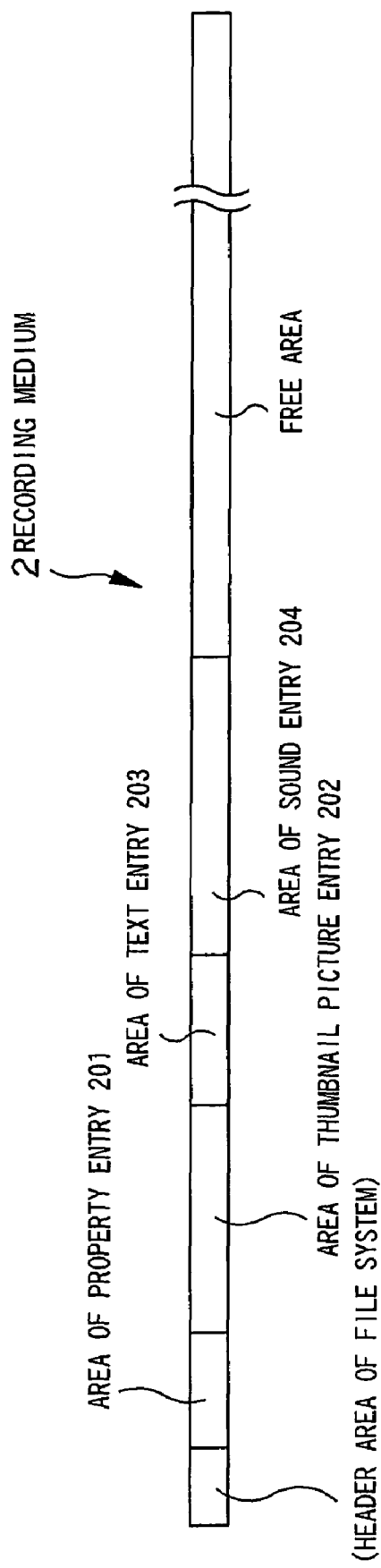
FIG. 9 is a view for explaining a case of setting an invalid flag or writing invalid data in entry areas of various entries.

At step S13, the system control unit 15 sets an invalid flag as described above, first for the property entry 201, of the entry areas of the various entries 201 to 204 provided on the recording medium 2, as shown in FIG. 9. In this case, the system control unit 15 may set an invalid flag at each entry number, for example, in accordance with a physical area where the index file can be continuously recorded. In this case, the system control unit 15 may identify the number of entries for which an invalid flag can be set with respect to the physical area for recording the index file and may decide an entry number at which an invalid flag is to be actually set, in accordance with the number of identified entries.

The system control unit 15 may also set an invalid flag at each entry number, for example, in accordance with all the physical areas where the index file can be continuously recorded. The system control unit 15 may also set an invalid flag for a maximum number of entries that can be handled by the recording apparatus 1.

Next, the system control unit 15 shifts to step S14 and writes invalid data for the entry number at which the above-described invalid flag is set, in each area of the thumbnail picture entry 202, the text entry 203 and the sound entry 204 on the recording medium 2, as shown in FIG. 9. In the entry in which this invalid data is written, a new content file can be registered.

Execution of initialization processing before first recording a content file to the recording medium 2 enables achievement of the following effects. That is, in the recording apparatus 1 to which this invention is applied, an entry area with an invalid flag added thereto is continuously provided for each entry, with respect to a physical area where an index file can be continuously recorded. This enables recording of the index file including each entry area without fragmentation on the recording medium 2 as shown in FIG. 9, and enables reduction in the quantity of movement of the optical pickup 11. Therefore, the index file can be read out at a high speed. Even if the number of entries increases, the reading time for the index file can be restrained. Moreover, even with a recording apparatus in which a recording medium of a low access speed is loaded, a smooth reading operation can be realized.

Furthermore, as the continuity of entry numbers at which an invalid flag is set is increased, the continuity of the physical area where the index file is recorded on the recording medium 2 can be increased further and the reading time for the index file can be restrained further. Particularly, as an invalid flag is set in the entries corresponding all the physical areas where the index file can be continuously recorded, or as an invalid flag is set in a maximum number of entries that can be handled by the recording apparatus 1, the reading time for the index file can be reduced to a minimum level.

Figure 10:
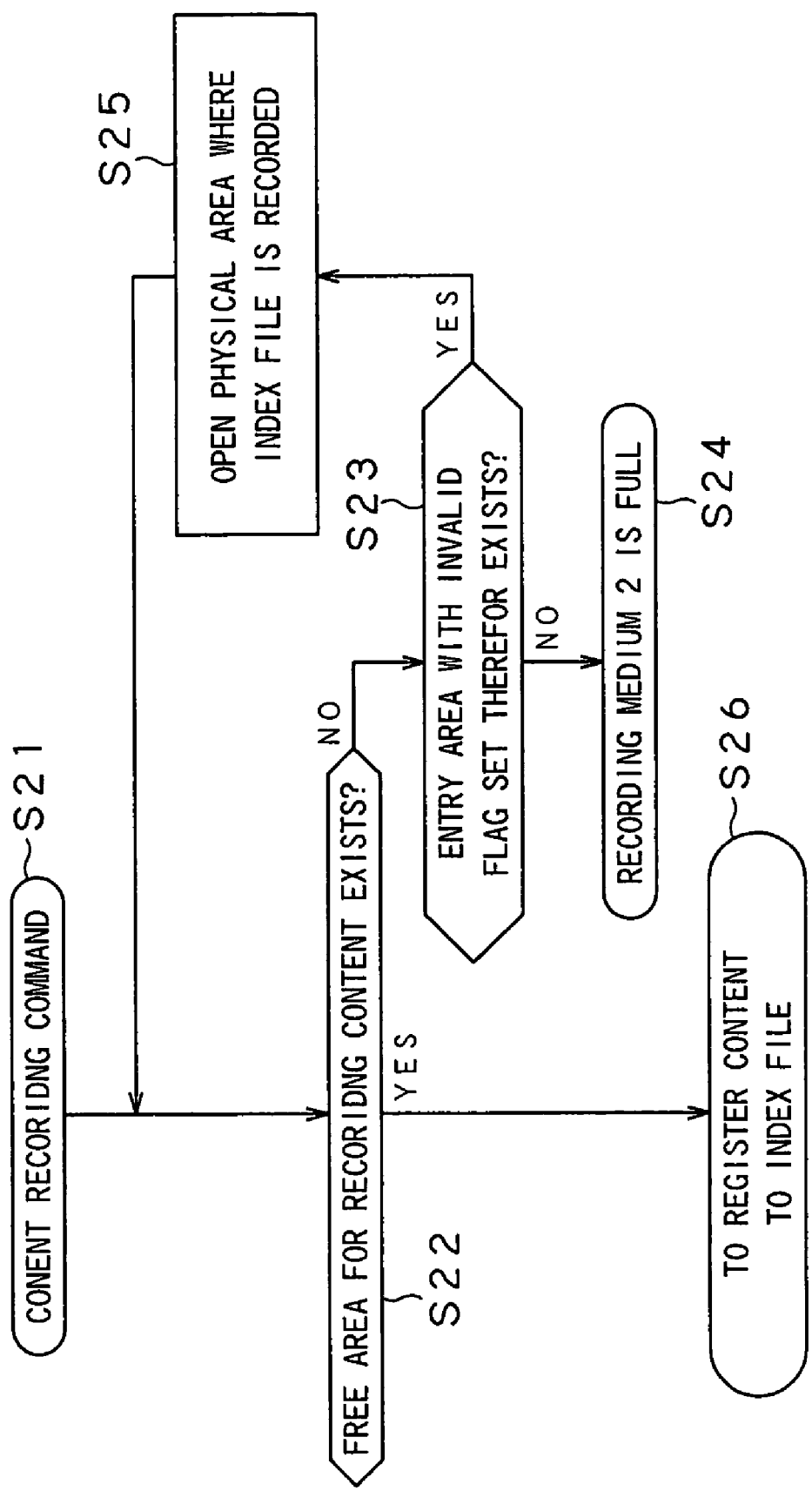
FIG. 10 is a flowchart showing a procedure of recording a content file to an initialized recording medium.

A procedure of recording a content file to the initialized recording medium 2 will now be described with reference to FIG. 10.

First, as the system control unit 15 at step S21 receives a content file recording command inputted, for example, via the operation input unit 16, the system control unit 15 shifts to step S22, then accesses the recording medium 2 and confirms the existence of a free area in which a content file is to be recorded. If there is no free area for recording the content file on the recording medium 2, the system control unit 15 shifts to step S23. On the other hand, if there is a free area for recording the content file on the recording medium 2, the system control unit 15 shifts to step S26 to record the content file into that free area and register the content file in the index file.

At step S23, the system control unit 15 identifies the presence/absence of an entry where an invalid flag is set, with respect to the property entry 201 of the index file recorded on the recording medium 2. If there is an entry where an invalid flag is set, the system control unit 15 shifts to step S25. Otherwise, the system control unit 15 shifts to step S24.

In the case where the system control unit 15 shifts to step S24, it is indicated that each entry on the recording medium 2 is already filled with a corresponding content file, and no new content file can be recorded. Therefore, the system control unit 15 notifies the user of the fact that no new content file can be recorded, and then ends this processing.

Figure 11A:
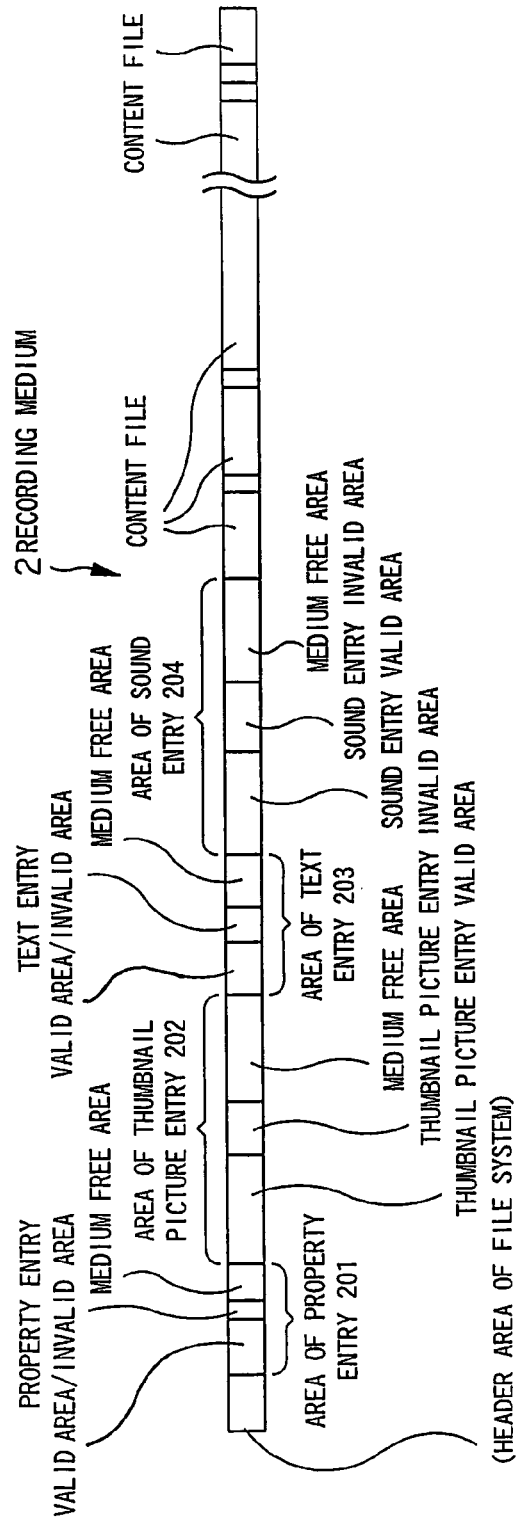
FIGS. 11A and 11B are views for explaining a case of opening a physical area in which an index file is recorded.

On the other hand, in the case where the system control unit 15 shifts to step S25, the system control unit 15 opens the entry provided with an invalid flag in the index file, as a free area for recording the content file. FIG. 11A shows a case of opening the physical area where the index file is recorded, on the recording medium 2. Of the various entries 201 to 204, an entry area having an entry number with an invalid flag or invalid data added thereto is referred to as invalid area. Of the various entries 201 to 204, an entry area having an entry number with a valid flag or valid data added thereto is referred to as valid area. As shown in FIG. 11A, when opening the area where the index file is recorded, the system control unit 15 opens each area where not only the property entry 201 but also the thumbnail picture entry 202, the text entry 203 and the sound entry 204 are recorded. This enables securing of an area for newly recording a content file and an area for an index file in which the content file is to be registered, on the recording medium 2.

Figure 11B:
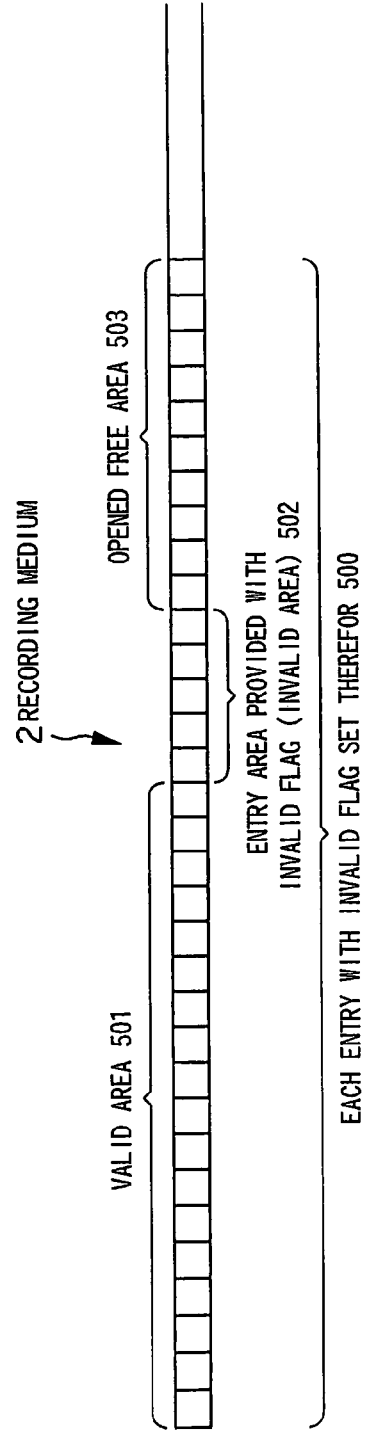

FIG. 11B is a view for explaining the case of opening the physical area from the property entry 201. In the property entry 201, an invalid flag is first set for each entry 500, and a valid flag is sequentially set for entries in which content files are registered. As the system control unit 15 shifts to step S25 and a part of the physical area of the property entry 201 is opened, an entry area 502 provided with an invalid flag for an entry that will be necessary later and a free area 503 secured for recording a new content file are generated, in addition to an entry area 501 remaining as a valid area because a content file is registered therein.

After the processing of step S25 ends, the system control unit 15 is to shift again to step S22. However, since the free area for recording a content file already exists on the recording medium 2, the system control unit 15 shifts directly to step S23.

Figure 12:
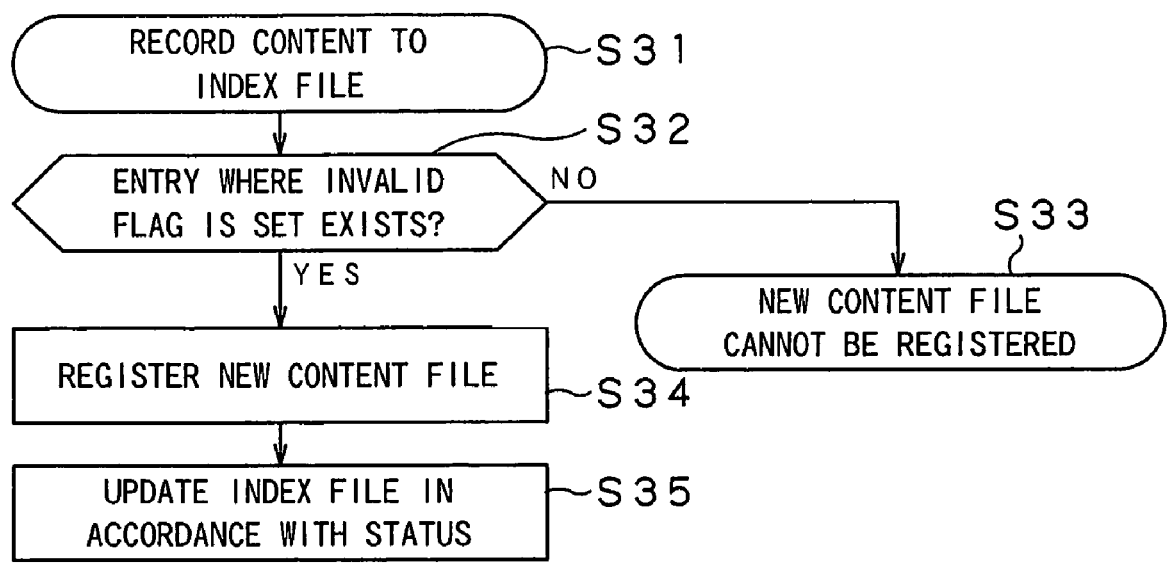
FIG. 12 is a flowchart showing a procedure of registering a content file newly recorded to a recording medium, to an index file.

A procedure of registering, in the index file, the content file newly recorded on the recording medium 2 will now be described with reference to FIG. 12.

First, as the system control unit 15 at step S31 identifies that a content file is to be newly recorded to the recording medium 2, the system control unit 15 shifts to step S32. If there is no entry where an invalid flag is set in the index file, the system control unit 15 shifts to step S33. On the other hand, if there is an entry where an invalid flag is set in the index file, the system control unit 15 shifts to step S34.

At step S33, since it is indicated that each entry on the recording medium 2 is already filled with a content file and no new content file can be registered, the system control unit 15 notifies the user of the fact that no new content file can be registered, and then ends this processing.

At step S34, the system control unit 15 extracts the entry where an invalid flag is set, from the index file. Moreover, the system control unit 15 newly registers a content file in this extracted entry and resets the invalid flag in the entry property 3 as a valid flag.

Finally, the system control unit 15 shifts to step S35 and sequentially updates the index file on the recording medium 2 in accordance with the status.

Figure 13:
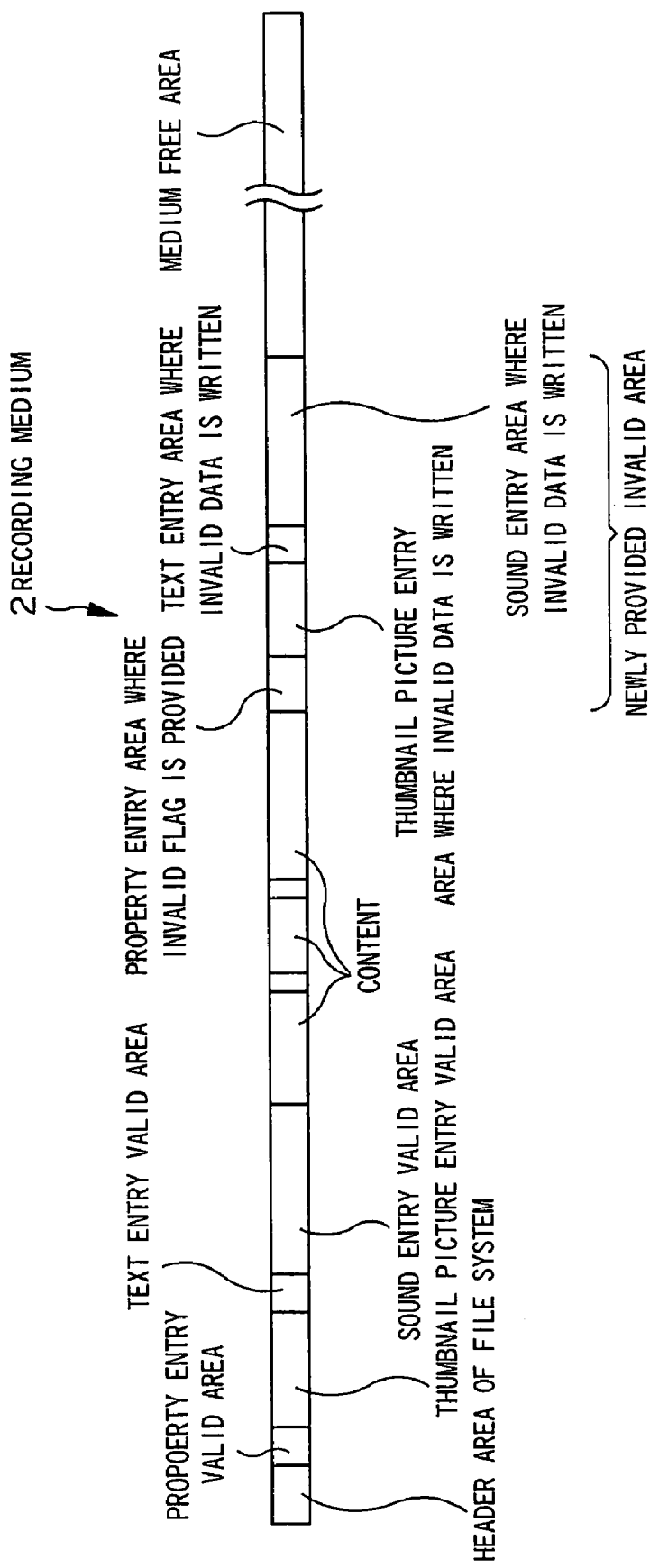
FIG. 13 is a view for explaining a case of searching for a physically continuous free area and adding this free area as an invalid area in an index file.

In the recording apparatus 1 to which this invention is applied, in the case where the entry areas in the index file are already filled, the recording medium 2 can be searched for a physically continuous free area and this free area can be added as an invalid area in the index file, as shown in FIG. 13.

On the recording medium 2 shown in FIG. 13, valid areas are provided in the various entries 201 to 204 in the index file in accordance with the already recorded content file. To record a new content file to this recording medium 2, an index file for registering the content file is necessary. Therefore, the system control unit 15 searches the recording medium 2 for a physically continuous free area. As a result, the system control unit 15 searches for such a free area following the content file already recorded on the recording medium 2, then provides an index file therein and adds an invalid area, for example, as shown in FIG. 13.

Figure 14:
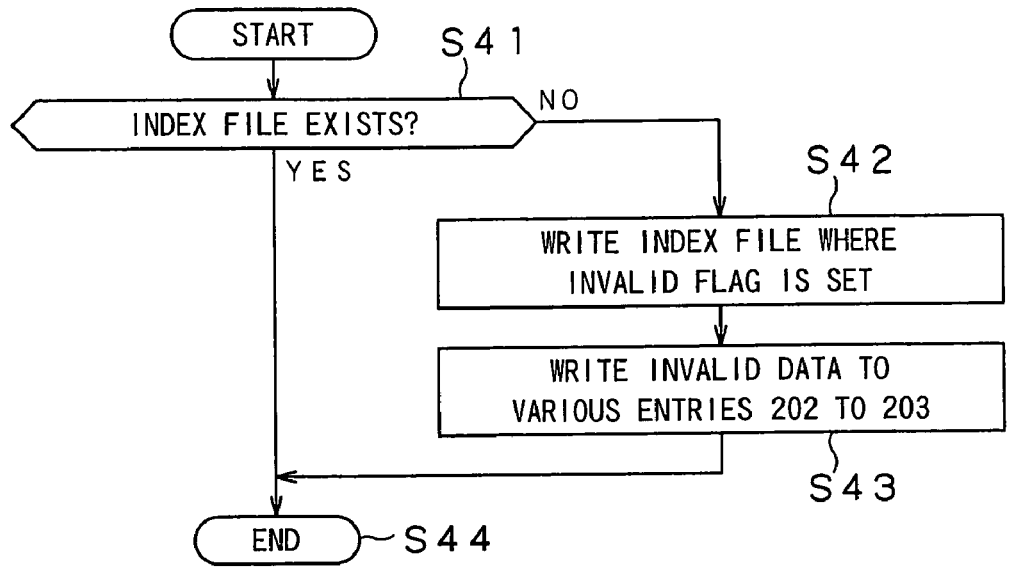
FIG. 14 is a flowchart showing a procedure of adding an invalid area in an index file.

FIG. 14 shows a procedure of adding an invalid area in this index file.

First, at step S41, the system control unit 15 confirms the presence/absence of an index file in which an invalid area is left, on the recording medium 2. If there is an index file in which an invalid area is left, the system control unit 15 shifts to step S44. Otherwise, the system control unit 15 shifts to step S42.

At step S42, the system control unit 15 searches the recording medium 2 for a physically continuous free area. Then, the system control unit 15 writes the index file with an invalid flag set therein to the free area thus searched for, with respect to the property entry 201.

Next, the system control unit 15 shifts to step S43 and writes invalid data in accordance with the entry number at which the above-described invalid flag is set, with respect to the thumbnail picture entry 202, the text entry 203 and the sound entry 204. As the processing up to this step S43 is executed, an invalid area can be newly added, as shown in FIG. 13.

At step S44, an operation to end this index file preparation processing is executed.

In the recording apparatus 1 to which this invention is applied, since an invalid area can be newly added even when there is no index file in which an invalid area is left, a newly recorded content file can be recorded into the invalid area. Since the index file having this added invalid area is recorded in a physically continuous area on the recording medium 2, fragmentation of this index file can be prevented even when the area in which the content file is recorded exists partly. This enables reduction in the quantity of movement of the optical pickup 11 and therefore enables high-speed reading of the index file.

Figure 15:
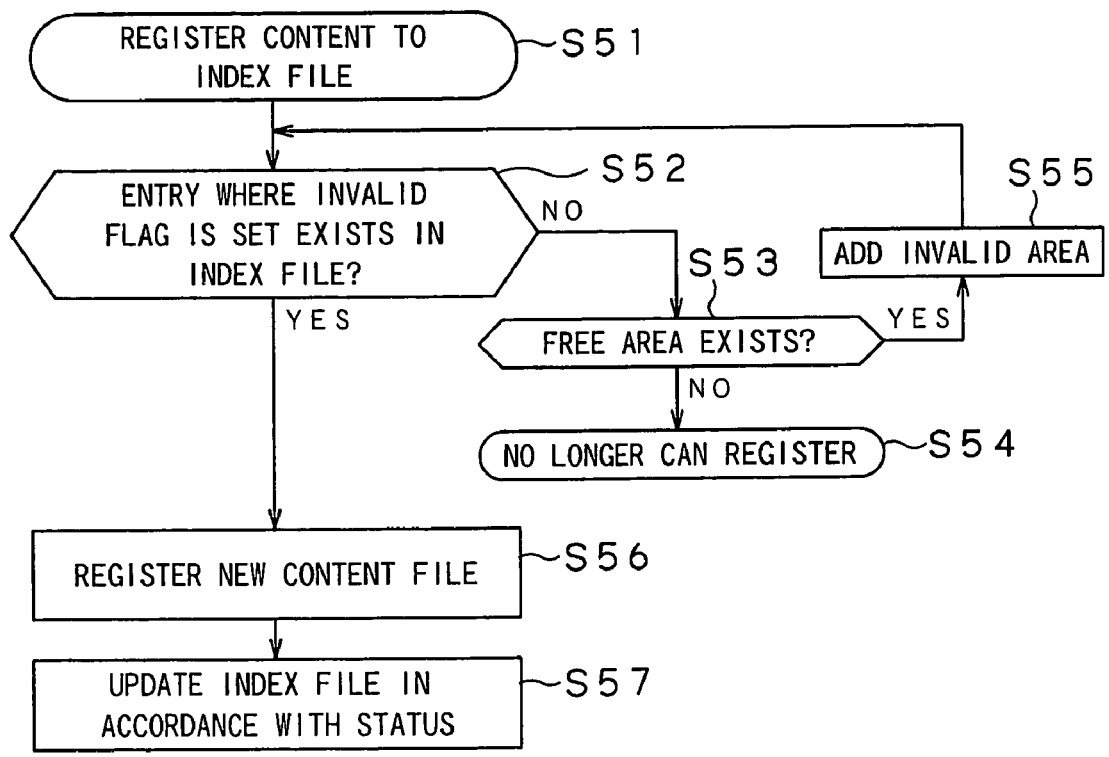
FIG. 15 is a flowchart showing a procedure of registering a newly recorded content file to an entry of added invalid area.

A procedure of registering a newly recorded content file in an entry in the invalid area added by the procedure shown in FIG. 14 will now be described with reference to FIG. 15.

First, as the system control unit 15 at step S51 identifies that a content file is newly recorded to the recording medium 2, the system control unit 15 shifts to step S52 and confirms the existence of an entry where an invalid flag is set in the index file. If there is no entry where an invalid flag is set in the index file, the system control unit 15 shifts to step S53. On the other hand, if there is an entry where an index file is set in the index file, the system control unit 15 shifts to step S56.

At step S53, the system control unit 15 confirms the existence of a free area on the recording medium 2. If the existence of a free area cannot be confirmed, the system control unit 15 shifts to step S54. If the existence of a free area is confirmed, the system control unit 15 shifts to step S55.

In the case where the system control unit 15 shifts to step S54, since the recording medium 2 is already filled with content files, the system control unit 15 notifies the user of the fact that the recording medium is filled, and then ends this processing.

In the case where the system control unit 15 shifts to step S55, the system control unit 15 searches the free area confirmed at step S53 for a physically continuous area and adds an invalid area. After the processing of this step S55 ends, the system control unit 15 is to shift again to step S52. However, since there already is an entry with an invalid flag set on the index file on the recording medium 2, the system control unit 15 shifts directly to step S56.

At step S56, the system control unit 15 extracts the entry where an invalid flag is set, from the index file. Moreover, the system control unit 15 newly registers a content file in this extracted entry and resets the invalid flag as a valid flag.

Finally, the system control unit 15 shifts to step S57 and sequentially updates the index file on the recording medium 2 in accordance with the status.

The recording apparatus 1 to which this invention is applied is not limited to the above-described embodiment. Not only Quick Time but also other software having OS extension functions may be used.

The extraction of an entry where an invalid flag is provided may be realized at a high speed by forming a so-called linked list of invalid entries in advance.

In the case where the total number of entries of content files handled by the recording medium 2 is large, an index file may be formed for entries corresponding to the total number divided by 10.

While the invention has been described in accordance with a certain preferred embodiment thereof illustrated in the accompanying drawings and described in the above description in detail, it should be understood by those ordinarily skilled in the art that the invention is not limited to the embodiment, but various modifications, alternative constructions or equivalents can be implemented without departing from the scope and spirit of the present invention as set forth and defined by the appended claims.

What is claimed is:

1. A recording apparatus configured to generate an index file for each content file to be recorded to a recording medium, the index file associating attribute information allocated to each content file with real data of said each content file, and configured to record the generated index file to the recording medium, the apparatus comprising:
    an information adding unit configured to generate a flag indicating a recording state of a content file to be recorded to the recording medium and configured to add the flag to the attribute information,
    wherein the information adding unit is further configured to continuously provide entry areas in which a flag indicating invalidity is set in a physical area in which the index file can be continuously recorded, and to write invalid data in the entry areas before said each content file is recorded first to the recording medium.

2. The recording apparatus of claim 1, wherein the physical area includes all physical areas in which the index file can be continuously recorded.

3. The recording apparatus of claim 1,
    wherein the information adding unit is further configured to search the recording medium for a free area in which the index file can be continuously recorded in accordance with the recording state of said each content file with respect to the recording medium, to add an entry area in which the flag indicating invalidity is set in the free area thus searched for, and to write invalid data in the added entry area.

4. The recording apparatus of claim 3, wherein the information adding unit is configured to newly record the index file, having the attribute information to which the flag indicating a recording state of a content file to be recorded to the recording medium is added, to the added entry area.

5. A recording method for generating an index file for each content file to be recorded to a recording medium, the method comprising:
    associating attribute information allocated to each content file with real data of said each content file, and recording the generated index file to the recording medium;
    generating a flag indicating a recording state of a content file to be recorded to the recording medium and adding the flag to the attribute information;
    continuously providing entry areas in which a flag indicating invalidity is set in a physical area in which the index file can be continuously recorded; and
    writing invalid data in the entry areas before said each content file is recorded first to the recording medium.

6. The recording method of claim 5, wherein the physical area includes all physical areas in which the index file can be continuously recorded.

7. The recording method of claim 5, comprising:
    searching the recording medium for a free area in which the index file can be continuously recorded in accordance with the recording state of said each content file with respect to the recording medium;
    adding an entry area in which the flag indicating invalidity is set in the free area thus searched for; and
    writing invalid data in the added entry area.

8. The recording method of claim 7, comprising:
    recording the index file, having the attribute information to which the flag indicating a recording state of a content file to be recorded to the recording medium is added, to the added entry area.

9. The recording apparatus of claim 1,
    wherein the information adding unit is further configured to extract from the index file the entry areas in which the flag indicating invalidity is set and is configured to newly register a content index file by resetting the flag in the extracted entry area as a valid flag.

10. The recording apparatus of claim 1,
wherein the entry areas in which the flag indicating invalidity are set are property entries to which entry numbers are assigned;
the information adding unit is further configured to continuously provide other entry areas corresponding to the entry numbers for each kind of the attribute information and to write invalid data in the property areas and the other entry areas before said each content file is recorded first to the recording medium.

11. The recording apparatus of claim 10, wherein the information adding unit is further configured to continuously provide the entry areas in all physical areas in which the index file can be continuously recorded.

12. The recording apparatus of claim 11,
wherein the information adding unit is further configured to extract the property entry areas in which the flag indicating invalidity is set and the other entry areas corresponding to the entry numbers from the index file, and to newly register a content index file by resetting the flag in the property extracted entry area as a valid flag.

13. The recording apparatus of claim 12,
wherein the information adding unit is further configured to search the recording medium for a free area in which the index file can be continuously recorded in accordance with the recording state of said each content file with respect to the recording medium, to add a property entry area in which the flag indicating invalidity is set and the other entry area in the free area searched for, and to write an invalid data in the added property entry area and the added other entry area corresponding to the entry number of the added property entry area.

14. The method of claim 5, comprising:
extracting from the index file the entry areas in which the flag indicating invalidity is set from the index file; and
newly registering a content index file by resetting the flag in the extracted entry area as a valid flag.

15. The method of claim 5, comprising:
providing other entry areas corresponding to entry numbers for each kind of the attribute information; and
writing an invalid data in the property areas and the other entry areas before said each content file is recorded first to the recording medium,
wherein the entry areas in which the flag indicating invalidity are set are property entries to which the entry numbers are assigned.

16. The method of claim 15, comprising:
providing the entry areas in all physical areas in which the index file can be continuously recorded.

17. The method of claim 16, comprising:
extracting the property entry areas in which the flag indicating invalidity is set and the other entry areas corresponding to the entry numbers from the index file; and
newly registering a content index file by resetting the flag in the property extracted entry area as a valid flag.

18. The method of claim 17, comprising:
searching the recording medium for a free area in which the index file can be continuously recorded in accordance with the recording state of said each content file with respect to the recording medium;
adding a property entry area in which the flag indicating invalidity is set and the other entry area in the free area searched for; and
writing an invalid data in the added property entry area and the added other entry area corresponding to the entry number of the added property entry area.

* * * * *